(12) United States Patent  
Kim et al.

(10) Patent No.: US 8,439,433 B2  
(45) Date of Patent: May 14, 2013

(54) SINGLE MOTOR STRUCTURE FOR OPERATION OF PANORAMA SUNROOF GLASS AND ROLL BLIND AT THE SAME TIME

(75) Inventors: Chong-Heon Kim, Kwangmyoung-shi (KR); Kyung-Soon Jang, Seoul (KR); Gi-Won Kim, Hwasung-shi (KR); Ho-Seok Kang, Anyang-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/315,107

(22) Filed: Dec. 8, 2011

(65) Prior Publication Data

US 2013/0074650 A1 Mar. 28, 2013

(30) Foreign Application Priority Data

Sep. 23, 2011 (KR) .......................... 10-2011-0096540

(51) Int. Cl.  
*B60J 7/057* (2006.01)

(52) U.S. Cl.  
USPC ................. 296/214; 296/223; 318/4; 49/352

(58) Field of Classification Search .............. 296/223, 296/214; 49/352; 318/4, 6; 310/83  
See application file for complete search history.

(56) References Cited

U.S. PATENT DOCUMENTS

| | | | | |
|---|---|---|---|---|
| 3,927,436 A | * | 12/1975 | Inoue et al. | 15/250.17 |
| 5,009,296 A | * | 4/1991 | Ohkawa et al. | 192/20 |
| 5,069,502 A | | 12/1991 | Sekine et al. | |
| 5,688,019 A | * | 11/1997 | Townsend | 296/155 |
| 6,000,077 A | * | 12/1999 | Cyr | 5/618 |
| 6,588,828 B2 | * | 7/2003 | Fisher | 296/146.4 |
| 7,441,833 B1 | * | 10/2008 | Pomeroy et al. | 296/216.06 |
| 7,891,730 B2 | * | 2/2011 | Rikkert | 296/223 |
| 2006/0284450 A1 | | 12/2006 | Regnier et al. | |

FOREIGN PATENT DOCUMENTS

| | | | |
|---|---|---|---|
| DE | 4318481 | * | 12/1994 |
| EP | 1588882 | * | 4/2004 |
| JP | 2005-217311 A | | 11/2005 |
| KR | 1020030082892 A | | 10/2003 |

* cited by examiner

*Primary Examiner* — Dennis Pedder  
(74) *Attorney, Agent, or Firm* — Morgan, Lewis & Bockius LLP

(57) ABSTRACT

A single motor structure for operation of a panorama sunroof glass and a roll blind may include a motor supplying a motive power to the panorama sunroof glass and the roll blind, a rotating shaft rotatably connected to a side of the motor, a first actuating gear and a second actuating gear, which may be spaced symmetrically from the rotating shaft with a predetermined distance, a first actuating member combined with the first actuating gear so as to rotate with the first actuating gear to control open-shut of the panorama sunroof glass, a second actuating member combined with the second actuating gear so as to rotate with the second actuating gear so as to control open-shut of the roll blind, and a first actuating relay member and a second actuating relay member, which may be combined with each of the first actuating member and the second actuating member respectively.

4 Claims, 8 Drawing Sheets

SINGLE MOTOR STRUCTURE FOR OPERATION OF PANORAMA SUNROOF GLASS AND ROLL BLIND AT THE SAME TIME

CROSS-REFERENCE TO RELATED APPLICATION

The present application claims priority to Korean Patent Application No. 10-2011-0096540, filed on Sep. 23, 2011, the entire contents of which is incorporated herein for all purposes by this reference.

BACKGROUND OF THE INVENTION

1. Field of the Invention

The present invention relates to a motor structure for panorama sunroof, and more particularly, to a single motor structure for operation of panorama sunroof glass and roll blind at the same time.

2. Description of Related Art

Panorama sunroof, which takes up most part of the roof panel, is made of glass, and is arranged so that it can be selectively opened for the refreshing openness and the aesthetic pleasure in design, is used in today's vehicle frequently.

By using such panorama sunroof, the passengers and the driver inside the vehicle can attain much more exposure to sunlight while the vehicle is operating or at a stop, and also those inside the car can feel more refreshed if panorama sunroof is left open while they are on the road.

The roof of the vehicle is no longer made of steel and is instead made of glass or fiber materials, and in conventional panorama sunroof, as displayed in FIG. 1, panorama sunroof glass 1 arranged on the outer surface of the vehicle moves back and forth, and electrically powered roll blind 2 arranged on the interior surface of the vehicle also moves back and forth in order to block the sunlight.

Besides, in the rear end of the vehicle's roof 3, the motor and the necessary actuating member to move the panorama sunroof glass 1 and the electrically powered roll blind 2 are arranged.

However, in the conventional panorama sunroof structure, as displayed in FIG. 2 and FIG. 3, separate motors 4 and 5 are used to move the panorama sunroof glass 1 and the roll blind 2, and the motor and the actuating member are connected to each other at all times, and they are arranged so that each actuating member operates individually, which leads to the problems of the abrasions of the parts and of the noise arising from the vibrations of the vehicle.

Also, since two motors 4 and 5, which are installed inside the panorama sunroof assembly, take up a considerable space, the designers are faced with a difficulty procuring space when designing a vehicle. Besides, because of those two motors, the mass of the vehicle increases unnecessarily, which leads to a lower fuel-efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a single motor structure in which only one motor is used to actuate the panorama sunroof glass and roll blind, and at the same time the relay principle is used in the motor connection structure so that the volume and the mass of the motor can be reduced.

In an aspect of the present invention, a single motor structure for operation of a panorama sunroof glass and a roll blind, may include a motor supplying a motive power to the panorama sunroof glass and the roll blind, a rotating shaft rotatably connected to a side of the motor to convey the motive power to the panorama sunroof glass and the roll blind, a first actuating gear and a second actuating gear, which are spaced symmetrically from the rotating shaft with a predetermined distance, a first actuating member combined with the first actuating gear so as to rotate with the first actuating gear to control open-shut of the panorama sunroof glass, a second actuating member combined with the second actuating gear so as to rotate with the second actuating gear so as to control open-shut of the roll blind, and a first actuating relay member and a second actuating relay member, which are combined with each of the first actuating member and the second actuating member respectively.

The single motor structure may further include a first elastic member and a second elastic member engaged with each of the first actuating gear and the second actuating gear respectively to supply elasticity thereto.

A first actuator and a second actuator to actuate the first actuating relay member and the second actuating relay member independently.

The single motor structure may further include a battery which supplies a power to the motor, the first actuator, and the second actuator.

The first actuator may include a first electromagnet, and the first actuator may include a second electromagnet, The single motor structure may further include a conductor linked to the first actuating relay member and the second actuating relay member, wherein the first and second electromagnets are turned on by the conductor with operation of each of a first switch or a second switch and moves the first actuating relay member and the second actuating relay member respectively such that the first actuating relay member and the second actuating relay member move the first or second actuating gear to be selectively engaged with the motor.

The single motor structure may further include a first elastic member and a second elastic member, which are combined with each of the first actuating gear and the second actuating gear respectively to supply elasticity to the first actuating gear and the second actuating gear so as to disengage the first actuating gear and the second actuating gear from the motor.

A lower cover and an upper cover are combined to receive the motor, the first actuating gear, and the second actuating gear, the first actuating member, the second actuating member, the first actuating relay member, the second actuating relay member, the first elastic member and the second elastic member therein.

A first connecting member and a second connecting member are arranged on a side of the lower cover and the upper cover to provide an electric power to the first electromagnet and the second electro magnet.

The efficacy of the present invention having the composition above is that, instead of having to use the two motors and an actuating member to actuate the panorama sunroof glass and the roll blind, now only one motor is used to do the same, and therefore, more space can be procured when designing the vehicle.

In addition, by using only one motor and one actuating member, the mass of the vehicle, which was increased unnecessarily, can be expected to decrease and the overall fuel efficiency to improve.

Moreover, the motor and the actuating gear are combined so the panorama sunroof glass or the roll blind is opened or closed only when the switch is selectively operated, which results in the enhanced durability of the internal gear as well as the reduced noise and the vibrations from the various parts.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
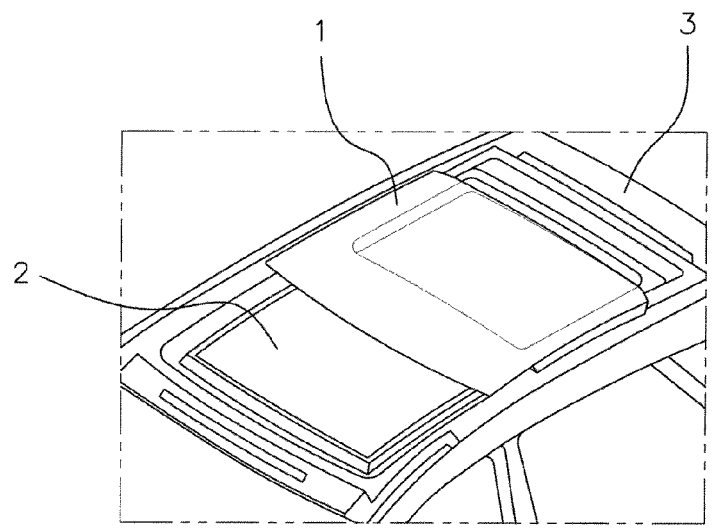
FIG. 1 is a perspective view illustrating the traditional panorama sunroof.
Figure 2:
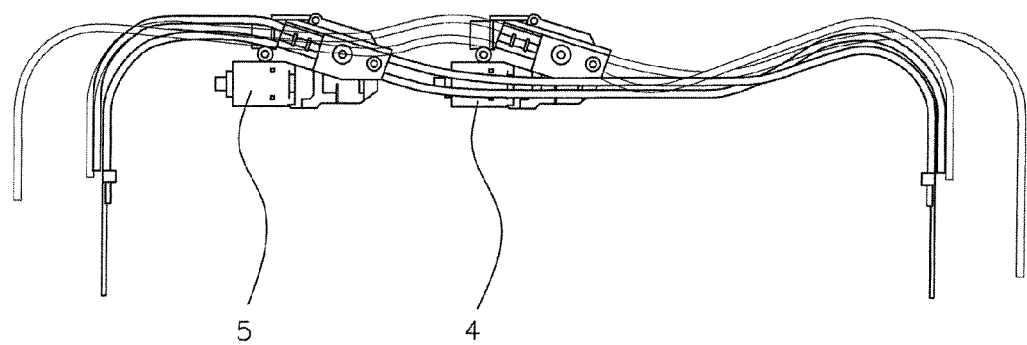
FIG. 2 and FIG. 3 are respectively a side view and a conceptual view illustrating the traditional panorama sunroof motor structure used to actuate the panorama sunroof glass and the roll blind.
Figure 3:
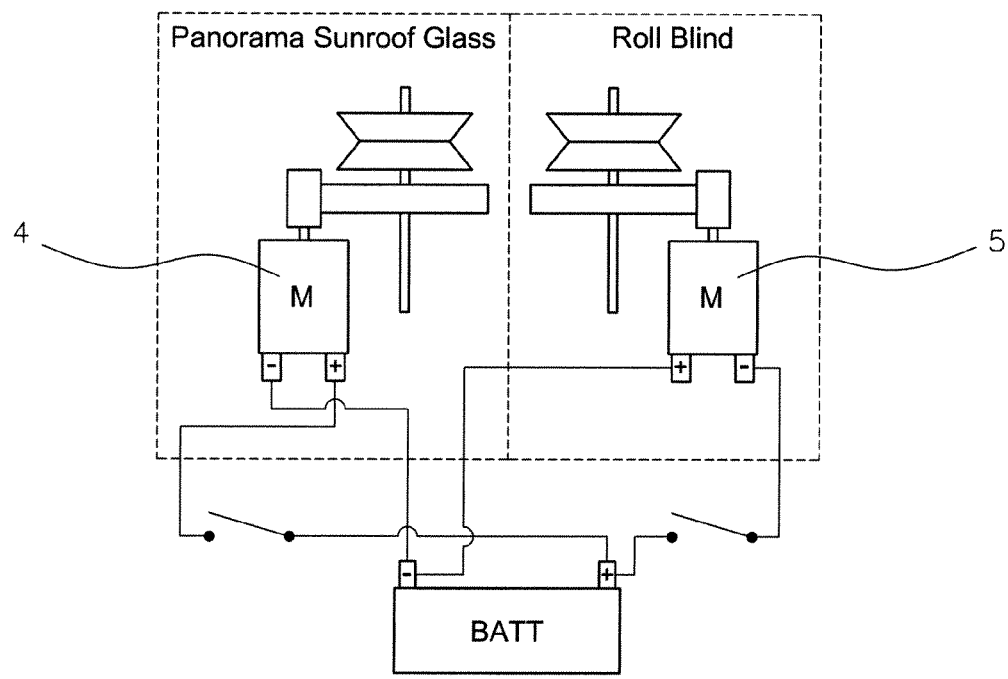

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, in accordance with the attached drawings, the present invention will be described in detail.

The subject invention of the single motor structure for operation of the panorama sunroof glass and the roll blind at the same time includes of a single motor 10, which supplies the motive power to the panorama sunroof glass and roll blind, a rotating shaft 11 connected to one side of the motor 10 to transmit the power, a first actuating gear 21 and a second actuating gear 22, spaced from each other at a certain distance on both sides of the rotating shaft 11 and rotate around it, a first actuating member 31 combined with the upper part of the first actuating gear 21 so that it rotates together with the first actuating gear 21 to control the open-and-shut of the panorama sunroof glass, a second actuating member 32 combined with the upper part of the second actuating gear 22 so that it rotates together with the second actuating gear 22 to control the open-and-shut of the roll blind, a first actuating relay member 41 and a second actuating relay member 42 which are combined with the first actuating member 31 and the second actuating member 32 respectively so that they are able to move up and down, the motor 10, and a battery 60 which supplies the power to the first actuating relay member 41 and the second actuating relay member 42.

Figure 4:
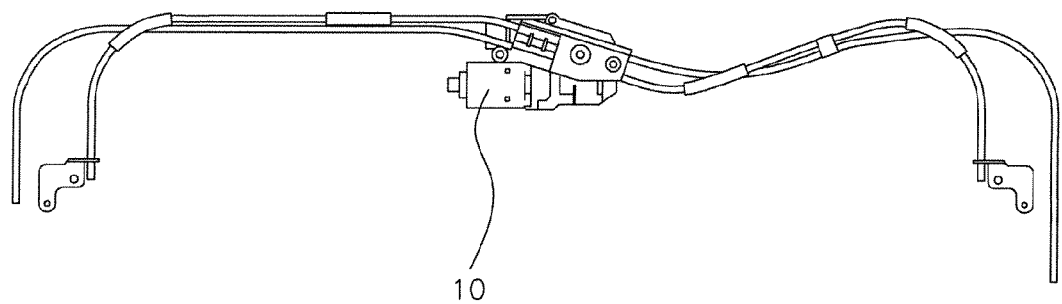
FIG. 4 is a side view illustrating another motor structure according to an exemplary embodiment of the present invention.
Figure 5:
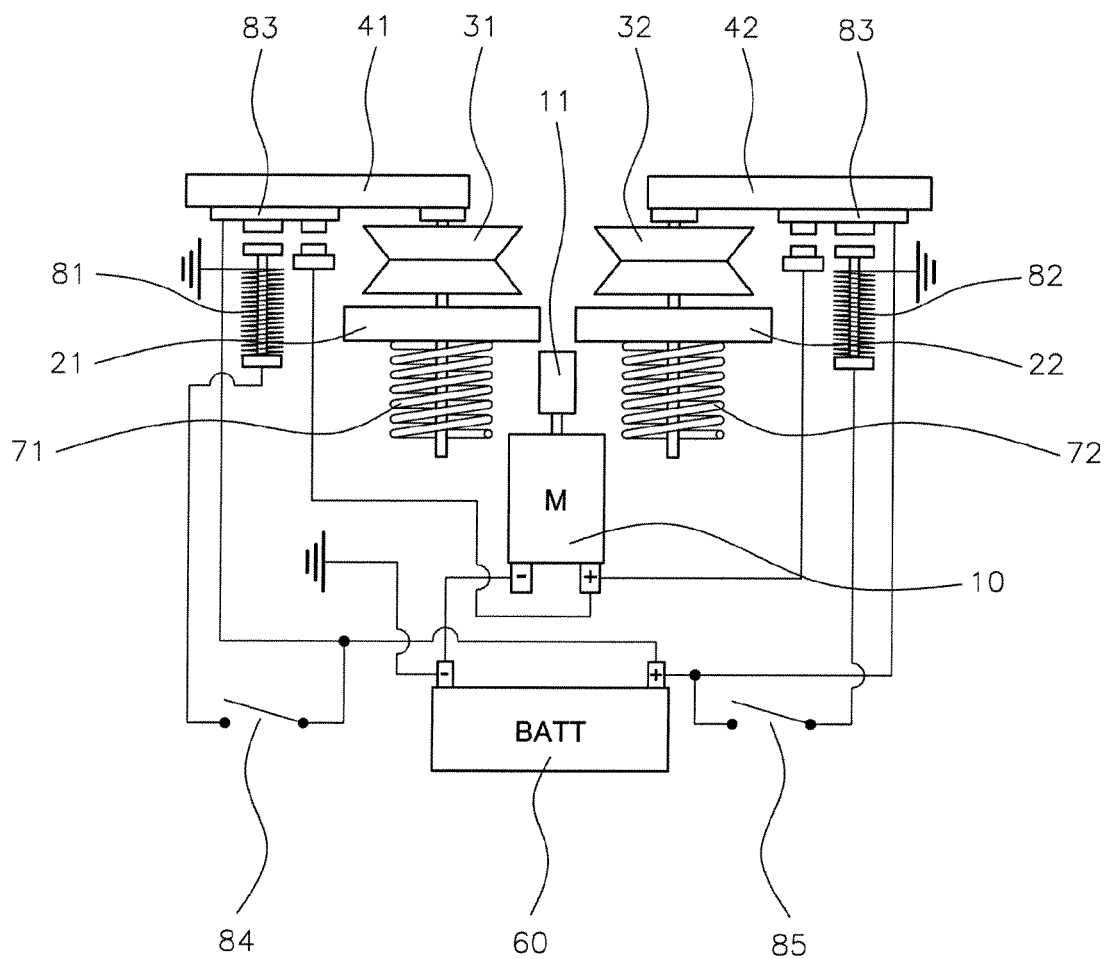
FIG. 5 is a conceptual view illustrating a motor structure according to an exemplary embodiment of the present invention.

As illustrated in FIG. 4 and FIG. 5, unlike in the traditional technology where separate motors were used to actuate the panorama sunroof glass and the roll blind, only one motor 10 is used and an actuating member is connected to the one motor so that the user can selectively open and shut the panorama sunroof glass or the roll blind.

In other words, if the one motor 10 connected to the battery 60 rotates, the rotating shaft 11 connected to one side of the motor 10 rotates at the same time, and as the rotating shaft 11 rotates, the rotating power of the motor 10 is conveyed to the actuating gear and the actuating member so that the panorama sunroof glass or the roll blind are opened or shut.

On both sides of the rotating shaft 11 are located a first actuating gear 21 and a second actuating gear 22, which are spaced symmetrically at a certain distance from each other so that they can be interlocked with or detached from the rotating shaft 11.

Preferably, the first actuating gear 21 and the second actuating gear 22 are disk shaped and are in the form of worm gears in touch with the sides of the rotating shaft 11 so that they can shift the rotating direction and rotate the actuating members with the rotating power they receive from the motor 10 and the rotating shaft 11.

The first actuating member 31 and the second actuating member 32 are combined with each of the upper parts of the first actuating gear 21 and the second actuating gear 22 respectively so that they can rotate according to the rotation of the first rotating gear 21 and the second actuating gear 32, wherein, the first actuating member 31 and the second actuating member 32 are connected to the panorama sunroof glass or the roll blind through wires to control the open-and-shut.

In the present embodiment, it is described that the first actuating gear 21 and the first actuating member 31 are connected to the panorama sunroof glass, and the second actuating gear 22 and the second actuating member 32 are connected to the roll blind. Also the direction of the connection can be altered easily depending upon the type of the vehicle or the position of the connection.

In addition, a first actuating relay member 41 and a second actuating relay member 42 are combined with each of the upper parts of the first actuating member 31 and the second actuating member 32 respectively, and the actuating relays are formed in a linear shape so that they move the actuating members vertically.

Furthermore, a conductor 83, which may be electrically charged, is linked to the lower parts of the first actuating relay member 41 and the second actuating relay member 42, wherein, in consideration of the linkage space with the first actuating member 31 and the second actuating member 32, preferably it is formed relatively smaller than the first actuating relay member 41 and the second actuating relay member 42. Also, in the lower part of the conductor 83 are located a first electromagnet 81 and a second electromagnet 82, which are spaced from the conductor 83 at a certain distance and become magnetic temporarily depending on whether the electricity goes through it or not.

The first electromagnet 81 and the second electromagnet 82 are separately connected to the battery 60, wherein, they are connected to the battery 60 by a first switch 84 and a second switch 85 respectively so that the user can selectively control their operation.

Figure 10:
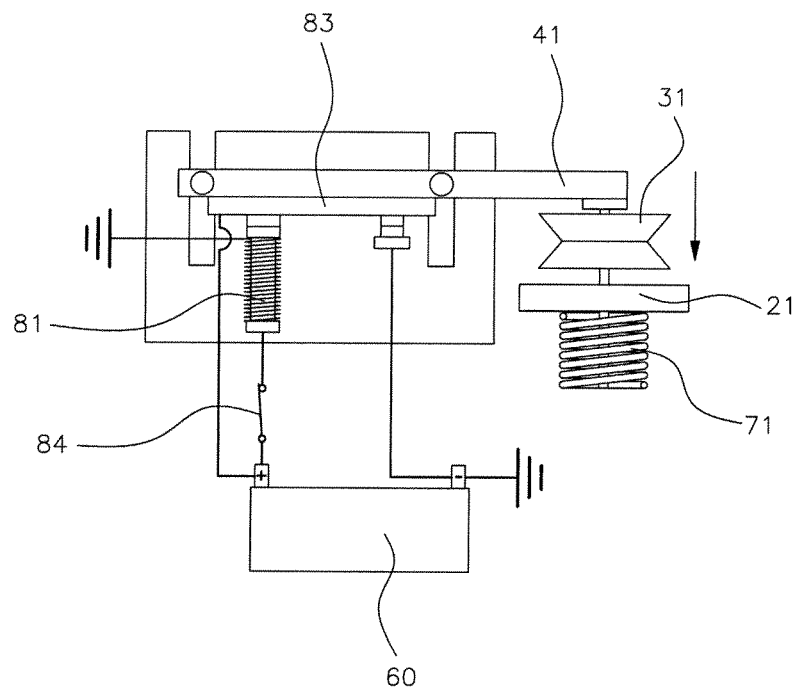

Therefore, as illustrated in the FIG. 10, if the user turns on the first switch 84 and the second switch 85, the power will be supplied from the battery 60 and the first electromagnet 81 and the second electromagnet 82 will start operating, and hence, the first actuating relay member 41 and the second actuating relay member 42 will move downward.

Figure 9:
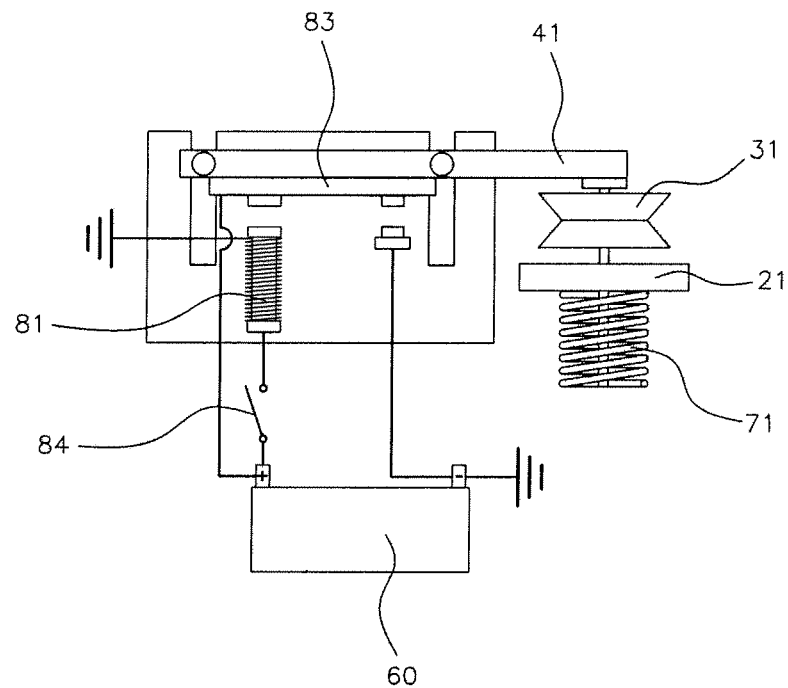
FIG. 9 and FIG. 10 are conceptual views illustrating the operational process of the actuating relay member used in the present invention.

On the contrary, as illustrated in FIG. 9, if the user turns off the first switch 84 and the second switch 85, the power supply from the battery 60 will be shut out, and therefore, the first actuating relay member 41 and the second actuating relay member 42 will move upward.

However, even though the process of the first actuating relay member 41 and the second actuating relay member 42 moving downward maintaining their distance from the first electromagnet 81 and the second electromagnet 82 can be achieved through turning on the switches and operating the electromagnets, since the process of returning the first actuating relay member 41 and the second actuating relay member 42 to the original position cannot be achieved merely by turning off the switches and shutting out the power supply, a first spring 71 and a second spring 72 are arranged in the lower parts of the first actuating gear 21 and the second actuating gear 22 respectively.

Hence, the upward elasticity is continuously supplied to the first actuating gear 21 and the second actuating gear 22, and if the switch is turned on, the coherence from the electromagnets, which is relatively stronger than the elasticity of the spring, is generated, moving the actuating gears and the actuating members downward so that they can combine with the motor 10 and the rotating shaft 11, and if the switch is turned off, since the coherence of the electromagnets is blocked, the actuating gear and the actuating member move upward by the elasticity of the spring and therefore, they can return to their original positions.

Figure 6:
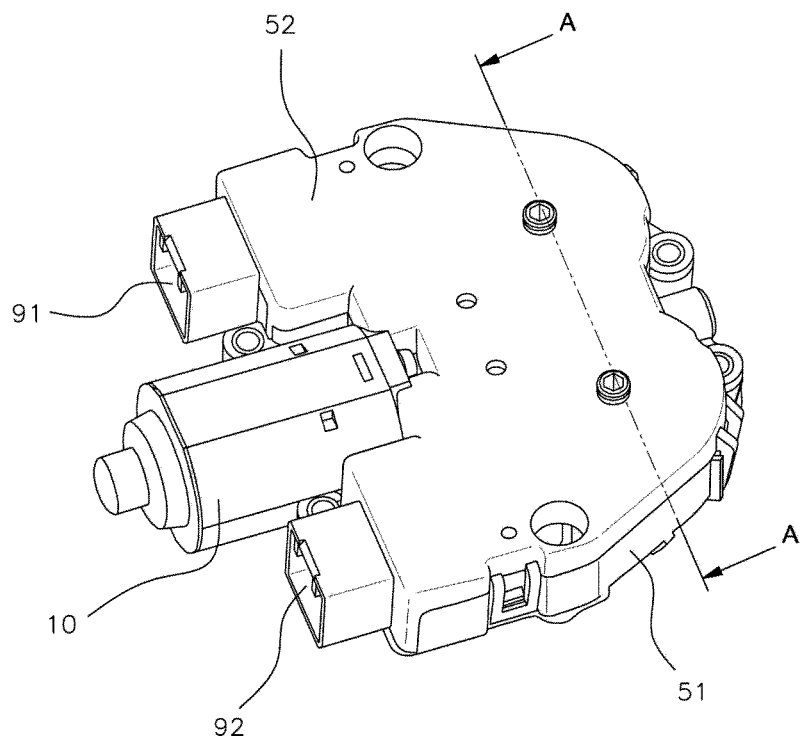
FIG. 6 is a perspective view illustrating a motor structure according to an exemplary embodiment of the present invention.
Figure 7:
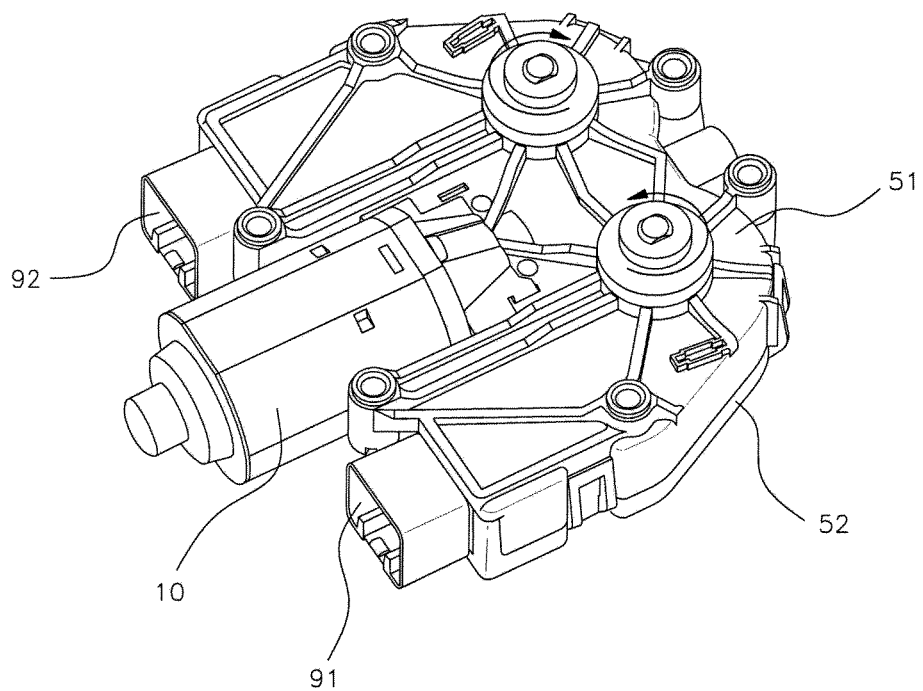
FIG. 7 is a bottom perspective view of FIG. 6.
Figure 8:
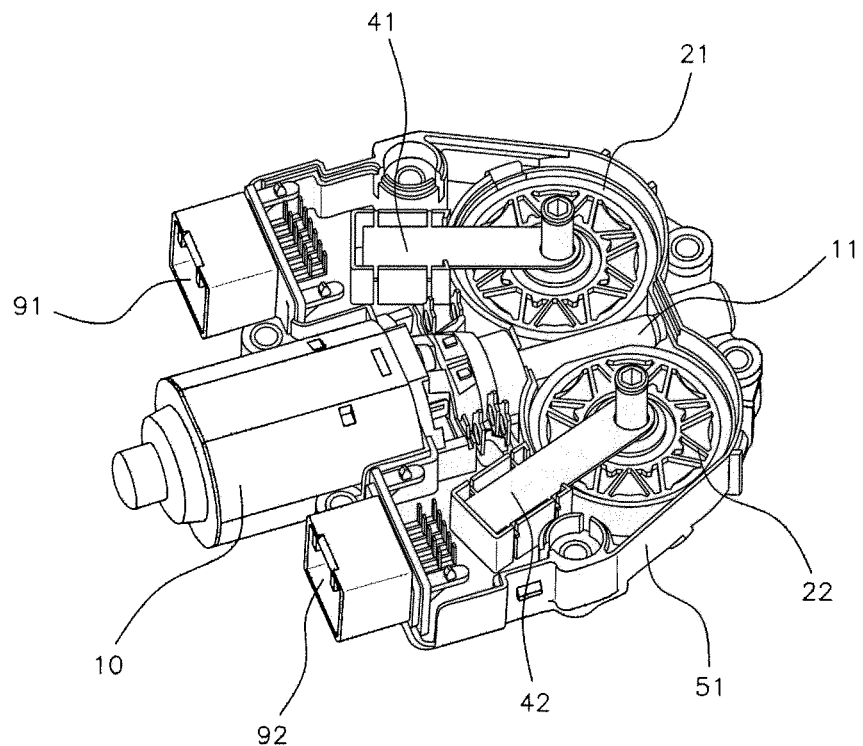
FIG. 8 is a perspective view illustrating the internal structure of the present invention of the motor structure without the upper cover.

In reference to FIG. 6 to FIG. 8, actuating gears, actuating members, actuating relays and springs are arranged in one side of the motor 10, and the lower cover 51 and the upper cover 52 are conjoined to fix them to the motor, and a first connecting member 91 and a second connecting member 92 are preferably formed in each of the one sides of the lower cover 51 and the upper cover 52 so that they can supply the power to the first electromagnet 91 and the second electromagnet 92.

Hereafter, the detailed process of operating the motor structure of the present invention will be described further with reference to FIG. 11 to FIG. 14.

Figure 11:
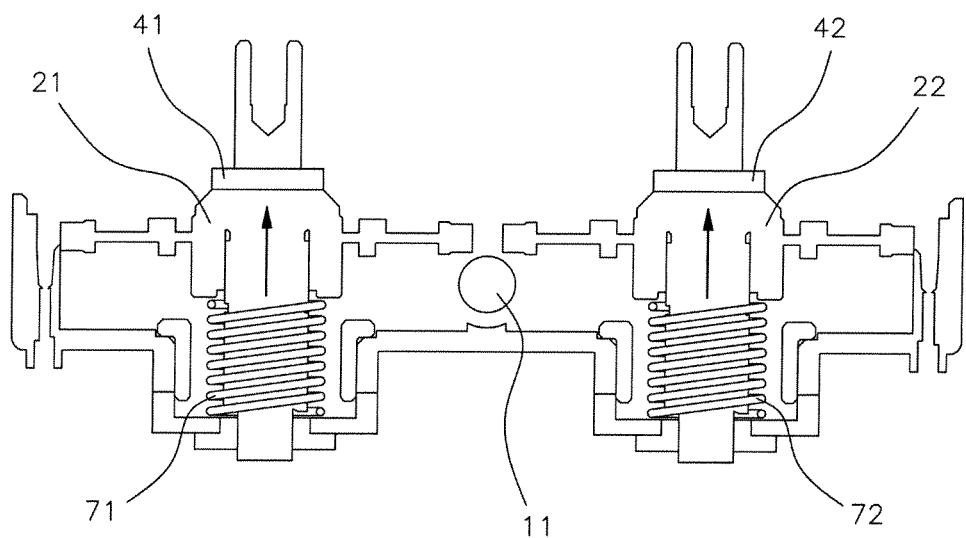
FIGS. 11 to 14 are cross-sectional views according to A-A of FIG. 6 and are conceptual views at the same time, illustrating the process of the panorama sunroof glass and roll blind being selectively operated.

FIG. 11 is a conceptual view illustrating the normal state when the panorama sunroof glass and the roll blind are not in operation, and as illustrated, in the normal state the actuating gears and the actuating relays are pushed upward by the elasticity of the springs, and therefore, the first actuating gear 21 and the second actuating gear 22 are all derailed from the rotating shaft 11 of the motor 10 and hence, even if the motor rotates, the panorama sunroof glass or the roll blind will not operate.

Figure 12:
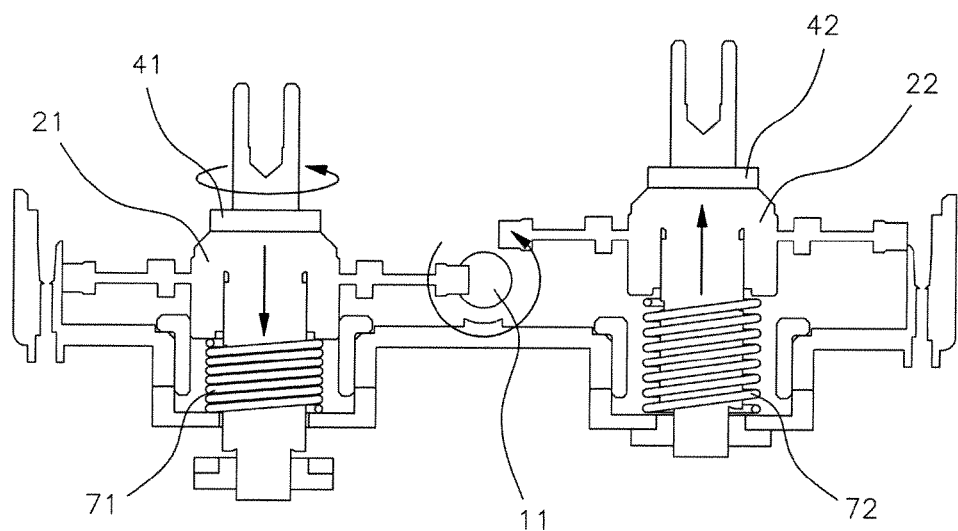
Figure 13:
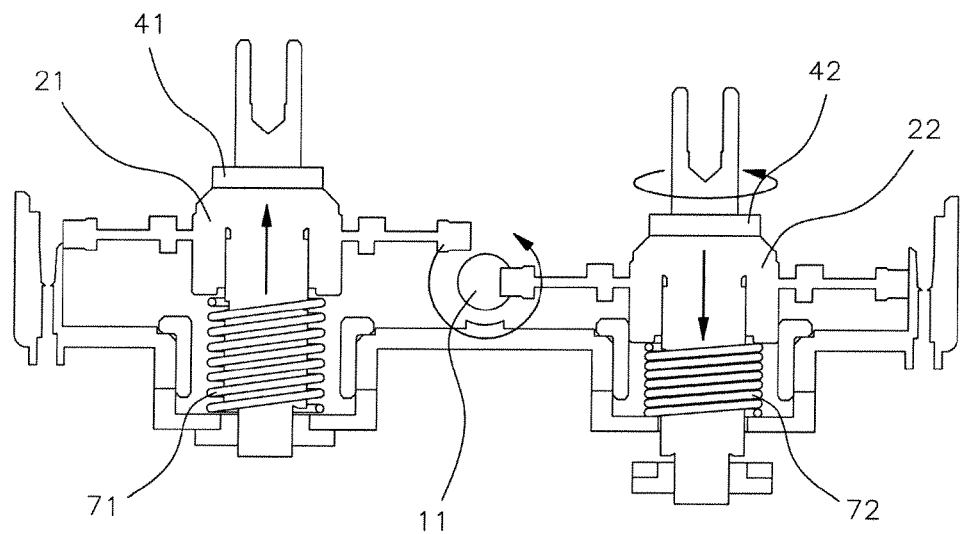
Figure 14:
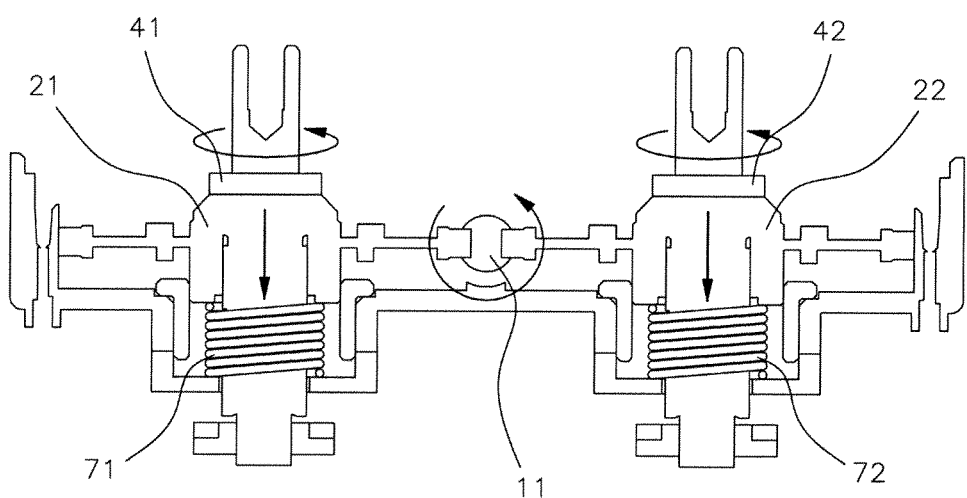

If the user wishes to operate only the panorama sunroof glass, he shall operate the first switch 84 connected to the panorama sunroof glass, and accordingly, the first actuating relay member 41 moves downward as described in the FIG. 9 and FIG. 10, moving the first actuating gear 21 downward (refer to FIG. 12).

At this time, since no power is conveyed to the second actuating gear 22, which operates the roll blind, the elasticity by the second spring 72 is continuously applied so the second actuating gear 22 is kept derailed from the rotating shaft 11. And, as explained previously, the force that the first actuating relay member 41 applies on the first actuating gear 21 to move it downward shall be relatively stronger than the elasticity of the first spring 71 and it shall be continuously maintained.

On the contrary to the above, if the user wishes to operate only the roll blind, he shall operate the second switch 85, which is connected to the roll blind, and, by the same method that was used above, the second actuating gear 22 shall be pushed downward to combine with the actuating shaft 11 in order for the operation to be achieved. Meanwhile, the elasticity of the spring is applied continuously to the panorama sunroof glass, which the user does not wish to operate, but since it is derailed from the rotating shaft 11, it does not operate (refer to FIG. 13).

Or, if the user wishes to operate the panorama sunroof glass and the roll blind at the same time, he shall turn on both the first switch 84 and the second switch 85 at the same time to operate the first actuating relay member 41 and the second actuating relay member 42 simultaneously so that the first actuating gear 21 and the second actuating gear 22 are pushed downward and interlocked to the rotating shaft 11 at the same time.

As such, by using a structure in which each actuating gear is selectively combined with one motor 10 to operate the panorama sunroof glass or the roll blind, the subject invention reduces the volume and mass of the panorama sunroof assembly, which, therefore, results in the reduced total vehicle mass as well as an advantage when designing a vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A single motor structure for operation of a panorama sunroof glass and a roll blind, the single motor structure comprising:
   a motor supplying a motive power to the panorama sunroof glass and the roll blind;

a rotating shaft rotatably connected to a side of the motor to convey the motive power to the panorama sunroof glass and the roll blind;

a first actuating gear and a second actuating gear, which are spaced symmetrically from the rotating shaft with a predetermined distance;

a first actuating member combined with the first actuating gear so as to rotate with the first actuating gear to control open-shut of the panorama sunroof glass;

a second actuating member combined with the second actuating gear so as to rotate with the second actuating gear so as to control open-shut of the roll blind;

a first actuating relay member and a second actuating relay member, which are combined with each of the first actuating member and the second actuating member respectively;

a first elastic member and a second elastic member engaged with each of the first actuating gear and the second actuating gear respectively to supply elasticity thereto;

a first actuator and a second actuator to actuate the first actuating relay member and the second actuating relay member independently, wherein the first actuator includes a first electromagnet and the second actuator includes a second electromagnet;

a battery which supplies a power to the motor, the first actuator, and the second actuator; and a conductor linked to the first actuating relay member and the second actuating relay member, wherein the first and second electromagnets are turned on by the conductor with operation of each of a first switch or a second switch and moves the first actuating relay member and the second actuating relay member respectively such that the first actuating relay member and the second actuating relay member directly move the first or second actuating gear to be selectively engaged with the motor.

2. The single motor structure of claim 1, the first elastic member and the second elastic member are combined with each of the first actuating gear and the second actuating gear respectively to supply elasticity to the first actuating gear and the second actuating gear so as to disengage the first actuating gear and the second actuating gear from the motor.

3. The single motor structure of claim 2, wherein a lower cover and an upper cover are combined to receive the motor, the first actuating gear, and the second actuating gear, the first actuating member, the second actuating member, the first actuating relay member, the second actuating relay member, the first elastic member and the second elastic member therein.

4. The single motor structure of claim 3, wherein a first connecting member and a second connecting member are arranged on a side of the lower cover and the upper cover to provide an electric power to the first electromagnet and the second electro magnet.

* * * * *